United States Patent [19]

Marandet

[11] Patent Number: 4,488,074
[45] Date of Patent: Dec. 11, 1984

[54] LOW POWER CONSUMPTION ELECTROMAGNETIC RETARDER ARMATURE ROTOR

[75] Inventor: André Marandet, Saint Gratien, France

[73] Assignee: Labavia S.G.E., Bois D'Arcy, France

[21] Appl. No.: 425,070

[22] Filed: Sep. 27, 1982

[30] Foreign Application Priority Data

Oct. 28, 1981 [FR] France ............... 81 20261

[51] Int. Cl.³ ............................ H02K 49/00
[52] U.S. Cl. ................... 310/93; 188/164; 310/77
[58] Field of Search ............ 310/92, 93, 105, 268, 310/76, 77, 78; 318/372; 188/164

[56] References Cited

U.S. PATENT DOCUMENTS

| | | | |
|---|---|---|---|
| 3,496,396 | 2/1970 | Jollois | 310/93 |
| 3,553,507 | 1/1971 | Bessiére | 310/93 |
| 3,626,226 | 12/1971 | Pauwels | 310/168 |
| 3,821,572 | 6/1974 | Bessiére | 310/93 |
| 3,871,466 | 3/1975 | Bessiére | 310/93 |
| 3,908,141 | 9/1975 | Lemannier | 310/93 |

*Primary Examiner*—J. D. Miller
*Assistant Examiner*—D. L. Rebsch
*Attorney, Agent, or Firm*—Stevens, Davis, Miller & Mosher

[57] ABSTRACT

In an electromagnetic retarder armature rotor, comprising a disk (1) connected to a securing collar (2) by means of a ring of rams (4, $4_1$) forming ventilation fins, the largest diameter portions of these arms projecting axially from the disk and their tops being connected together by an annular flange (5) parallel to the disk, the assembly of the disk, the collar, the arms and the flange forming a single molded block, if we call D the outer diameter of the disk (1), a the axial distance between this disk (1) and the flange (5), b the radial width of this flange (5) and r the inner radius of said flange (5), the ratio Db/ar is between 10 and 30.

5 Claims, 3 Drawing Figures

LOW POWER CONSUMPTION ELECTROMAGNETIC RETARDER ARMATURE ROTOR

The invention relates to armature rotors for electromagnetic retarders or speed reducers, particularly for vehicles, which rotors comprise at least one disk made from a ferromagnetic material to travel past a stator ring of alternately positive and negative electromagnetic poles from which it is only separated by an air-gap, this disk being then braked and heated through the creation of eddy currents in its mass.

It relates more particularly, among these rotors, to those whose disk is connected to a securing collar by means of a ring of arms, preferably bent and curved, forming ventilation fins, the largest diameter portions of these arms projecting from the face of the disk opposite the air-gap and the tops of these portions, being joined together by means of an annular flange parallel to the disk, the assembly of the disk, the collar, arms and flange forming a single molded block.

In known embodiments of said rotors:
the flange is relatively remote from the disk, which defines between these two elements a relatively large volume for the cooling air and, thus, a relatively high energy consumption for mechanically driving the rotor,
the radial width of the flange is relatively small, so that this latter only participates to a small extent in the dissipation of heat by convection.

Thus, if we call D the outer diameter of the disk, a the axial distance between the disk and the flange, b the radial width of the flange and r the inner radius of this flange, the ration Db/ar is, in known embodiments, less than 10 and generally of the order of 5: in this ratio, the product ar is directly proportional to the radial intake section for the cooling air between the disk and the flange and the fact that this ratio is relatively small means that, for a given outer diameter of the rotor and for a given width of the flange, said intake section is relatively large.

The aim of the invention, especially, is to reduce the above consumption of mechanical energy for a given value of the heating power able to be dissipated by the rotor during operation of the retarder and accessorily to lighten said rotor.

To this end, rotors of the kind in question in accordance with the invention are essentially characterized in that the ratio Db/ar is greater than 10 and preferably between 12 and 25.

In preferred embodiments, recourse is had further to one and/or the other of the following arrangements:
the ratio b/a is between 3.5 and 6,
the ratio b/r is between 0.6 and 1,
the inner radius of the flange is less than the inner radius of the disk.

The invention comprises, apart from these principal arrangements, certain other arrangements which are preferably used at the same time and which will be more explicitly discussed hereafter.

In what follows, preferred embodiments of the invention will be described with reference to the accompanying drawings in a way which is of course in no wise limiting.

FIG. 1 of the drawings shows, for the sake of comparison, a known electromagnetic retarder rotor in semi axial section.

Figure 3:
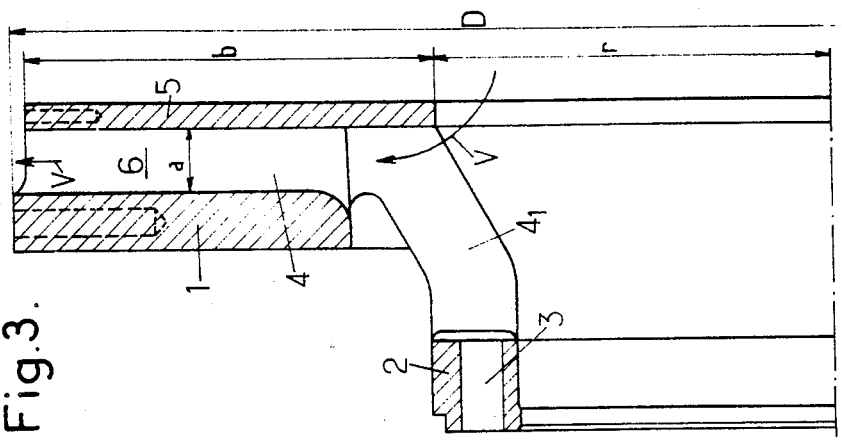
FIG. 3 shows, again in semi axial section, a variation also in accodance with the invention of such a rotor.

The word "rotor" is used in the present text to designate more precisely each of the molded ferromagnetic parts of the rotor assembly of an electromagnetic or "eddy current" retarder, which comprises such an armature disk.

As is known, such a disk is firmly secured to the shaft to be retarded, such as the transmission shaft of a vehicle, and it is mounted so as to be able to travel past the stator of the retarder, or more precisely past a ring of alternately positive and negative inductor poles forming part of the stator, with interposition of an air-gap, the disk in question then being the seat of eddy currents which then cause braking and heating of this disk.

The rotor assembly in question comprises another element, such as a sleeve, hub or central plate, itself fixed by bolts or in any other desirable way to the shaft to be retarded, the "rotor" here considered being for its part fixed to said element.

In a way known per se, the rotor in question is formed by a monobiock part molded from a ferromagnetic material such as semi-hard or slightly alloyed steel, comprising:
an armature disk 1,
a securing collar 2 having a mean diameter less than the inner diameter of the disk, pierced with axial bores 3, threaded or not, for receiving the securing bolts,
a ring of ventilation fins 4 projecting from the face of disk 1 opposite its face intended to define the air-gap, at least some of these fins (more especially one out of two or three) being extended towards the axis so as to form arms $4_1$ connecting the disk to collar 2.
and an annular rim or flange 5 extending parallel to the disk and connecting the tops of the largest diameter portions of fins 4 so as to form between these fins, the disk and the flange, guide channels 6 for the ventilation air.

Fins 4 and arms $4_1$ which extend therefrom are preferably curved rearwardly with respect to the direction of rotation of the rotor, if we consider the increasing radii, as was described in French Pat. No. 1 180 373.

Furthermore, the arms $4_1$ are preferably bent axially, as in the illustrated embodiments, so as to axially "return" collar 2 inwardly of the stator and thus to reduce the space taken up axially by the central portion of the rotor.

However, said arms $4_1$ could also be "straight" in the sense that their mean lines remain substantially contained within the same transverse plane.

The number of arms $4_1$ of each rotor is advantageously equal to eight and the total number of its fins 4, to sixteen.

Figure 1:
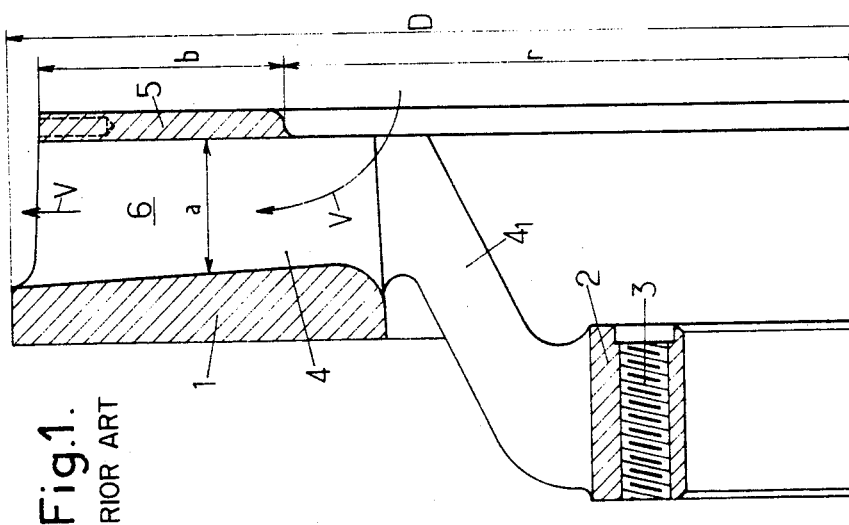

FIG. 1 illustrates a known embodiment of a rotor such as described above.

If we call D the outer diameter of this rotor, namely the outer diameter of its disk 1, a the mean axial distance between the two facing faces of this disk and of flange 5, b the radial width of the flange and r the inner radius of this flange, the ratio Db/ar is, in known embodiments, relatively small, namely less than 10 and generally of the order of 5. In other words, for given values of the diameter of the rotor and of the width of the flange, the product ar is relatively large. Since this product is directly proportional to the section offered for the radial intake of cooling air in the channels between the disk and the flange, the volume available for this air is relatively large.

The result, it is true, is that the removal of heat generated in disk 1, during operation of the retarder is relatively efficient, but also that the energy required for mechanically driving the rotor, operating "as a fan", is relatively high.

This relatively high value would hardly be a drawback if the energy in question were only to be consumed during operation of the retarder.

But this is not the case, since the rotor must be driven even when cold, that is to say outside periods of energization of the retarder, as is usual for vehicle retarders.

The invention proposes reducing this mechanical energy required for driving the rotor while maintaining a sufficient capacity for this rotor to dissipate the heat generated in the disk during operation of the retarder.

It is in fact known that the maximum deceleration torque capable of being generated by an electromagnetic retarder in permanent operation is directly related to this heat dissipation capacity.

To this end, in accordance with the invention, the intake section considered is reduced, and so the product ar, all other things being equal, by giving to the ratio Db/ar a relatively large value, namely between 10 and 30 and preferably between 12 and 25.

For this, the ratio D/a is first of all given a value between 16 and 25, preferably between 19 and 23.

Figure 2:
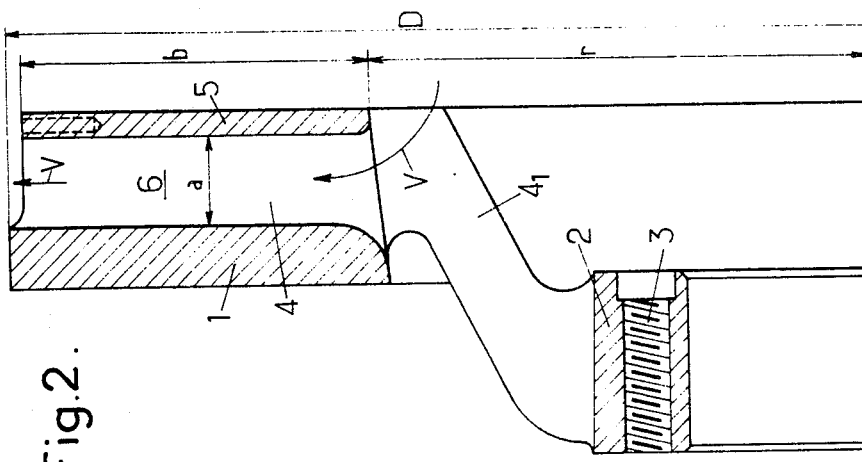
FIG. 2 shows, also in semi axial section, such a rotor constructed in accordance with the invention.

It is such a value that has been adopted for each of the rotors shown in FIGS. 2 and 3, which differ eessentially by the relative diameter of the securing collar 2: this diameter is greater in the case of FIG. 3 than in that of FIG. 2, the rotor of this FIG. 3 being more particularly intended for equipping a retarder of the type designated under the trademark FOCAL, mounted in cantilever fashion on the output of the gear-box or on the input of a vehicle rear axle.

The reduction thus made to dimension a leads to an overall reduction in the cross-section offered to the ventilation air stream V at the outlet of channel 6.

The cross-section offered to said air stream V at the inlet of said channels is also reduced concurrently, not only axially but also radially.

For this, the inner diameter of flange 5 is reduced while widening radially this flange, all other things being equal.

In other words, instead of this flange being formed by a relatively narrow washer only covering the periphery of the portions of fins 5 projecting from disk 1, said flange is formed by a relatively wide washer extending radially over at least the greatest part of the radial extent of the disk itself (FIG. 2) and even possibly protruding considerably beyond this extent towards the common axis (FIG. 3).

In the case of the narrowest flange (FIG. 2), its inner radius is only greater than that of the disk by a few millimeters, the difference between these inner radii corresponding at most to 5% of the radial width of this disk: by way of comparison, in known embodiments, the radial width of the inner portion of the disk, "uncovered" by the flange was generally greater than a quarter of the radial width of this disk.

In their connection zone at the inner edge of flange 5, arms $4_1$ may have a top flush with the flat and transversal external surface of this flange so as to extend this surface inwardly, as shown in FIG. 2, or may be completely covered by said flange, as shown in FIG. 3.

Generally, it may be said that the ratio between the radial width b of flange 5 and the inner radius r of this flange, which ratio defines the relative width of the washer, was at most equal to 0.55 in known embodiments and here becomes greater than 0.55, preferably between 0.6 and 1.1.

Similarly, the ratio between said width b and the axial distance a between the flange and the disk, which radius defines the elongation and the narrowness of channels 6, was at most equal to 3 in known embodiments and here becomes greater than 3, being preferably between 3.5 and 6.

The increase in the radial width b of flange 5 itself has the advantage of increasing the area of the internal and external faces of this flange which is exposed to the ambient air and so the capacity of this flange to dissipate heat by convection.

Since at the same time said flange is closer to the disk than in known embodiments, it receives more heat therefrom.

For these two reasons, flange 5 plays a greater part in heat dissipation than in known embodiments and this increased participation of the flange itself in heat dissipation compensates in part for the reduction of the contribution made by the ventilation in this dissipation.

It may be further observed that, despite the increase in radial b of the flange, the overall weight of the rotor is greatly reduced because of the reduction of dimension a, which corresponds to an axial shortening of the ventilation fins: this reduction in weight reaches 3 kg for each rotor whose outer diameter is of the order of 500 mm, which corresponds to a reduction in weight of 6 kg in the case of a retarder having two such symmetrical rotors.

Experience shows that, in a surprising way, the adoption of the above-mentiond dimensional values causes a substantial reduction—reaching and even consierably exceeding 30% of the mechanical energy required for driving the rotor and that this reduction is not obtained to the detriment of the heat dissipation capacity of this rotor, this capacity being practically maintained within less than 5%.

It should be noted that the dimensional values proposed by the invention define ranges totally outside the corresponding values of known embodiments.

These ranges are limited, in their zones the furthest removed from known values, by the need to maintain a sufficient heat dissipatiom capacity for the rotor.

It is in fact not a question here of reducing the energy required for driving the rotor to a value such that it may impair said capacity: the choice of the dimensional ranges according to the invention represents the optimum compromise for reducing as much as possible the first factor (drive energy) without appreciably reducing the second factor (dissipation capacity).

The facing faces of disk 1 and flange 5 are advantageously flat and parallel to each other, as shown in FIGS. 2 and 3. But one at least of these faces may have a slightly truncated cone shape, giving to the axial section of each ventilation channel a slightly outwardly diverging shape, as shown in FIG. 1, or inwardly: in these latter cases, the value considered for distance a in the above formulae is the mean value of this distance.

Following which, and whatever the embodiment adopted, a retarder rotor is finally obtained whose construction and advantages (reduction of the mechanical drive energy, reduction in weight, overall axial shortening) follow sufficiently from what has gone before.

As is evident and as it follows moreover from what has gone before, the invention is in no wise limited to those modes of application and embodiments which have been more especially considered; it embraces, on the contrary, all variations thereof.

I claim:

1. An electromagnetic retarder armature rotor, comprising a disk (1) connected to a securing collar (2) by means of a ring of arms (4, 4₁) forming ventilation fins, the largest diameter portions of these arms projecting axially from the disk and their tops being connected together by an annular flange (5) parallel to the disk, the assembly of the disk, the collar, the arms and the flange forming a single molded block in which the outer diameter of the disk (1) D, the axial distance between this disk (1) and the flange (5) a, the radial width of this flange (5) b and the inner radius of said flange (5) r, are related such that the ratio Db/ar is between 10 and 30.

2. A rotor according to claim 1, characterized in that the ratio Db/ar is between 12 and 25.

3. A rotor according to any one of claims 1 and 2, characterized in that the ratio b/a is between 3.5 and 6.

4. A rotor according to claim 1, characterized in that the ratio b/r is between 0.6 and 1.1.

5. A rotor according to claim 4, characterized in that the inner radius (r) of the flange (5) is less than the inner radius of the disk (1).

* * * * *